(12) United States Patent
Huang et al.

(10) Patent No.: US 11,708,815 B2
(45) Date of Patent: Jul. 25, 2023

(54) SYSTEM AND METHOD FOR CONTROLLING A WIND TURBINE

(71) Applicant: General Electric Company, Schenectady, NY (US)

(72) Inventors: Dayu Huang, Rexford, NY (US); Hullas Sehgal, Niskayuna, NY (US); Conner Brooks Shane, Glenville, NY (US); Kalpesh Singal, Ballston Spa, NY (US)

(73) Assignee: General Electronic Company, Schenectady, NY (US)

( * ) Notice: Subject to any disclaimer, the term of this patent is extended or adjusted under 35 U.S.C. 154(b) by 151 days.

(21) Appl. No.: 17/169,839

(22) Filed: Feb. 8, 2021

(65) Prior Publication Data
US 2022/0252045 A1 Aug. 11, 2022

(51) Int. Cl.
F03D 7/04 (2006.01)
F03D 7/02 (2006.01)
F03D 17/00 (2016.01)
(52) U.S. Cl.
CPC ........... F03D 7/042 (2013.01); F03D 7/0264 (2013.01); F03D 17/00 (2016.05);
(Continued)
(58) Field of Classification Search
CPC ........ F03D 7/0264; F03D 7/042; F03D 17/00; F05B 2260/80; F05B 2270/107; F05B 2270/327; F05B 2270/335
See application file for complete search history.

(56) References Cited
U.S. PATENT DOCUMENTS 4,605,107 A 8/1986 Hallidy et al.
4,660,697 A 4/1987 Yoneda et al.
(Continued)

FOREIGN PATENT DOCUMENTS

CN 202645849 U 1/2013
CN 108386324 A 8/2018
(Continued)

OTHER PUBLICATIONS

Ahmar et al., Advanced Signal Processing Techniques for Fault Detection and Diagnosis in a Wind Turbine Induction Generator Drive Train: A Comparative Study, 5617707, 2010 IEEE Energy Conversion Congress and Exposition, Atlanta, GA, 2010, pp. 3576-3581. (Abstract Only) https://ieeexplore.ieee.org/document/5617707.

(Continued)

*Primary Examiner* — Tulsidas C Patel
*Assistant Examiner* — Thomas K Quigley
(74) *Attorney, Agent, or Firm* — Dority & Manning, P.A.

(57) ABSTRACT

A system and method are provided for controlling a wind turbine. Accordingly, a controller of the wind turbine detects a loss of traction of the slip coupling based on a difference between data indicative of a rotor operating parameter and data indicative of a generator operating parameter. The controller then determines an angle of slip corresponding to the loss of traction as a function of the difference. Based, at least partially on the angle of slip, a degradation value for the slip coupling is determined. A control action is implemented based on the degradation value.

18 Claims, 6 Drawing Sheets

(52) U.S. Cl.
CPC ..... *F05B 2260/80* (2013.01); *F05B 2270/107* (2013.01); *F05B 2270/327* (2013.01); *F05B 2270/335* (2013.01)

(56) References Cited

U.S. PATENT DOCUMENTS

| | | | |
|---|---|---|---|
| 8,123,478 | B2 | 2/2012 | Ahmarm |
| 8,317,462 | B2 | 11/2012 | Daniels et al. |
| 8,332,164 | B2 | 12/2012 | Castell Martinez |
| 8,364,424 | B2 | 1/2013 | Lou et al. |
| 8,692,400 | B2 | 4/2014 | Lee |
| 8,932,017 | B2 * | 1/2015 | Heidenreich ........... F03D 15/00 290/55 |
| 9,097,239 | B2 * | 8/2015 | Heidenreich ........... F03D 15/00 |
| 9,423,290 | B2 | 8/2016 | Sakaguchi et al. |
| 9,458,835 | B2 | 10/2016 | Ikeda et al. |
| 9,835,136 | B2 | 12/2017 | Haj-Maharsi |
| 10,006,441 | B2 | 6/2018 | Schindele et al. |
| 10,047,726 | B2 | 8/2018 | Sakaguchi |
| 10,352,795 | B2 | 7/2019 | De Bauw et al. |
| 10,473,708 | B2 | 11/2019 | Izal et al. |
| 10,519,935 | B2 | 12/2019 | Sakaguchi et al. |
| 10,570,887 | B2 | 2/2020 | Son et al. |
| 10,590,915 | B2 | 3/2020 | Takahashi |
| 10,655,607 | B2 | 5/2020 | Potter et al. |
| 2012/0045335 | A1 * | 2/2012 | Heidenreich ........... F03D 17/00 192/41 R |
| 2012/0201679 | A1 * | 8/2012 | Heidenreich ........... F03D 15/00 416/146 R |
| 2012/0219418 | A1 | 8/2012 | Ingerslew et al. |
| 2015/0134189 | A1 | 5/2015 | Wash |
| 2016/0187226 | A1 | 6/2016 | Tsutsui et al. |
| 2017/0260968 | A1 | 9/2017 | Tsutsui et al. |
| 2018/0224324 | A1 | 8/2018 | Ikeda et al. |
| 2018/0328345 | A1 | 11/2018 | Rogg |
| 2019/0033169 | A1 | 1/2019 | Kamiya et al. |
| 2019/0101103 | A1 | 4/2019 | Haseba et al. |
| 2019/0128243 | A1 | 5/2019 | Hasan et al. |
| 2019/0195192 | A1 | 6/2019 | Takahashi |
| 2020/0025648 | A1 | 1/2020 | Haseba |
| 2020/0158562 | A1 | 5/2020 | Hatakeyama et al. |

FOREIGN PATENT DOCUMENTS

| | | |
|---|---|---|
| CN | 108757340 A | 11/2018 |
| CN | 110132581 A | 8/2019 |
| CN | 110174264 A | 8/2019 |
| EP | 2115412 A2 | 11/2009 |
| EP | 2431714 A1 | 3/2012 |
| EP | 2992209 A1 | 3/2016 |
| EP | 3168463 A1 | 5/2017 |
| JP | H08312523 A | 11/1996 |
| WO | WO 2012/023994 A1 | 2/2012 |
| WO | WO2015/012124 A1 | 1/2015 |
| WO | WO2016/091945 A1 | 6/2016 |
| WO | WO2017/163839 A1 | 9/2017 |

OTHER PUBLICATIONS

Artigao et al., The Use of Electrical Measurements of Wind Turbine Generators for Drive Train Condition Monitoring, Design Optimization of Wind Energy Conversion Systems with Applications, Intechopen, 2020, 26 Pages. (Abstract Only) https://www.intechopen.com/books/design-optimization-of-wind-energy-conversion-systems-with-applications/the-use-of-electrical-measurements-of-wind-turbine-generators-for-drive-train-condition-monitoring.

Asgari et al., Robust Model-Based Fault Diagnosis of Mechanical Drive Train in V47/660 kW Wind Tulbine, Springer Link, Energy Systems, vol. 9, 2018, pp. 921-952. (Abstract Only) https://link.springer.com/article/10.1007%2Fs12667-017-0231-2.

Chammas et al., Fault Diagnosis of Wind Turbine Drive Train Faults Based on Dynamical Clustering, IEEE Explore, 52$^{nd}$ IEEE Conference on Decision and Control, Dec. 10-13, 2013, Firenze Italy, pp. 5650-5655. (ABSTRACT ONLY) https://doi.org/10.1109/CDC.2013.6760779.

Jiang et al., Research of Electromechanical Simulation Model of Wind Turbine Drive Train Fault Diagnosis, CNKI, 1 Page. (Abstract Only) http://en.cnki.com/cn/Article_en/CJFDTotal-DJKZ201607012.htm.

Kallstrom, On-Board Feature Extraction for Clutch Slippage Deviation Detection, Lulea University of Technology, Licentiate Thesis, 2015, 116 Pages. http://www.diva-portal.org/smash/get/diva2:999832/FULLTEXT01.pdf.

Li et al., Fault Diagnosis of Wind Turbine Drive Train Using Time-Frequency Estimation and CNN, IEEE Explore 8942851, 2019 Prognostics and System Health Management Conference (PHM-Qingdao), Qingdao China, 2019, 3 Pages. (Abstract Only). https://ieeexplore.ieee.org/document/8942851.

Liu et al., Research on Fault Diagnosis of Drive Train in Wind Turbine Based on EMD and LSSVM, Advanced Materials Research, vol. 512-515, 2012, pp. 763-770. (Abstract Only) https://www.scientific.net/AMR.512-515.763 https://doi.org/10.4028/www.scientific.net/AMR.512-515.763.

Maheswari, Fault Diagnostics of Wind Turbine Drive-Train Using Multivariate Signal Processing, International Journal of Acoustics and Vibration, vol. 24, No. 2, 2019, pp. 334-342. https://pdfs.semanticscholar.org/fd95/dec2d5e()2bd375c4e23a471def9ee65821d4.pdf.

Nirosha et al., Condition Monitoring of Arrow Dynamic and Drive Train in Wind Turbine Using Artificial Intelligence, International Journal of Computer Science and Engineering Communications (IJCSEC), vol. 2, Issue 3, May 2014, 4 Pages. http://www.hindex.org/2014/1V2I3399402.pdf.

Romero et al., Condition Monitoring of a Wind Turbine Drive Train Based on its Power Dependent Vibrations, Renewable Energy, vol. 123, Aug. 2018, pp. 817-827. (Abstract Only) https://www.sciencedirect.com/science/article/abs/pii/S0960145117307139.

Shi et al., Fault Diagnosis Simulation Model Study of Wind Turbine Drive Train Based on Simulink, 22788, International Power, Electronics and Materials Engineering Conference (IMPEMEC 2015), Atlantis Press, Advances in Engineering Research, May 2015, 5 Pages. https://www.atlantis-press.com/proceedings/ipemec-15/22788https://dx.doi.org/10.2991/ipemec-15.2015.81.

Shi et al., Offshore 2015, European Wind Energy Association (EWEA), Conference Programme, Bella Center Copenhagen Denmark, Mar. 10-12, 2 Pages. (Abstract Only) http://www.ewea.org/offshore2015/conference/programme/info2.php?id2=266&id=26%20&ordre=9#top.

Wilkinson et al., Extracting Condition Monitoring Information from a Wind Turbine Drive Train, IEEE Explore, 39$^{th}$ International Universities Power Engineering Conference, vol. 1, UPEC 2004, Bristol UK, 2004, pp. 591-594. (Abstract Only) https://ieeexplore.ieee.org/abstract/document/1492088.

Yang et al., Condition Monitoring and Fault Diagnosis of a Wind Turbine Synchronous Generator Drive Train, IET Renewable Power Generation, 20080006, The Institution of Engineering and Technology, vol. 3, No. 1, Apr. 2009, pp. 1-11. https://www.researchgate.net/deref/http%3A%2F%2Fdx.doi.org%2F10.1049$2Fiet-rpg%3A2008006.

Yang, Condition Monitoring the Drive Train of a Direct Drive Permanent Magnet Wind Turbine Using Generator Electrical Signals, Journal of Solar Energy Engineering, 021008-379726, vol. 136, Issue 2, May 2014, 8 Pages. (Abstract Only) https://asmedigitalcollection.asme.org/solarenergyengineering/article-abstract/136/2/021008/379726/Condition-Monitoring-the-Drive-Train-of-a-Direct.

Yang et al., Sparse Time-Frequency Representation for Incipient Fault Diagnosis of Wind Turbine Drive Train, IEEE Xplore, IEEE Transactions on Instrumentation and Measurement, vol. 67, No. 11, Nov. 2018, pp. 2616-2627. (Abstract Only) https://ieeexplore.ieee.org/abstract/document/8361776.

Yu, Wind Turbine Data Analytics for Drive-Train Failure Early Detection and Diagnostics, ASME 2011 Turbo Expo, Turbine Technical Conference and Exposition, GT2011-45101, vol. 1: Aircraft Engine; Ceramics; Coal, Biomass and Alternative Fuels; Wind

(56) References Cited

OTHER PUBLICATIONS

Turbine Technology, Vancouver British Columbia Canada, Jun. 6-10, 2011, pp. 721-728. (Abstract Only) https://doi.org/10.1115/GT2011-45101.
European Search Report for EP application No. 22153436.5, dated Jun. 23, 2022.

* cited by examiner

SYSTEM AND METHOD FOR CONTROLLING A WIND TURBINE

FIELD

The present disclosure relates in general to wind turbines, and more particularly to systems and methods for controlling wind turbines based on a degradation value of the slip coupling in the drivetrain.

BACKGROUND

Wind power is considered one of the cleanest, most environmentally friendly energy sources presently available, and wind turbines have gained increased attention in this regard. A modern wind turbine typically includes a tower, a generator, a gearbox, a nacelle, and one or more rotor blades. The nacelle includes a rotor assembly coupled to the gearbox and to the generator. The rotor assembly and the gearbox are mounted on a bedplate support frame located within the nacelle. The one or more rotor blades capture kinetic energy of wind using known airfoil principles. The rotor blades transmit the kinetic energy in the form of rotational energy so as to turn a shaft coupling the rotor blades to a gearbox, or if a gearbox is not used, directly to the generator. The generator then converts the mechanical energy to electrical energy and the electrical energy may be transmitted to a converter and/or a transformer housed within the tower and subsequently deployed to a utility grid. Modern wind power generation systems typically take the form of a wind farm having multiple such wind turbine generators that are operable to supply power to a transmission system providing power to an electrical grid.

In certain instances, the rotor may be rotatably coupled to the generator via a slip coupling. The generation of torque by the generator and/or the inertia of the rotor may result in a loss of traction of the slip coupling, resulting in a slip of the slip coupling. The slipping of the slip coupling may result in the degradation of the slip coupling. Accordingly, it may be desirable to implement various control actions based on the degree of degradation of the slip coupling.

Thus, the art is continuously seeking new and improved systems and methods that address the aforementioned issues. As such, the present disclosure is directed to systems and methods for controlling a wind turbine based on a degradation value of the slip coupling.

BRIEF DESCRIPTION

Aspects and advantages of the invention will be set forth in part in the following description, or may be obvious from the description, or may be learned through practice of the invention.

In one aspect, the present disclosure is directed to a method for controlling a wind turbine. The wind turbine may have a drivetrain which includes a rotor having one or more rotor blades mounted thereto rotatably coupled to a generator via a slip coupling. The method may include detecting with a controller, a loss of traction of the slip coupling based on a difference between data indicative of a rotor operating parameter and data indicative of a generator operating parameter. The method may also include determining, via the controller, an angle of slip corresponding to the loss of traction as a function of the difference. Additionally, a degradation value for the slip coupling corresponding, at least partially, to the angle of slip may be determined.

Further, the method may include implementing a control action based on the degradation value.

In an embodiment, determining the angle of slip corresponding to the loss of traction as a function of the difference may include integrating, via the controller, the difference over a sampling interval to determine the angle of slip corresponding to loss of traction.

In an additional embodiment, detecting the loss of traction of the slip coupling may include receiving, via the controller, the data indicative of the rotor operating parameter and the data indicative of the generator operating parameter. The method may include filtering the data indicative of the rotor operating parameter and the data indicative of the generator operating parameter via a low-pass filter. Filtering the data may preclude an inclusion of at least one known parameter deviation in the determination of the difference between the data indicative of the rotor operating parameter and the data indicative of the generator operating parameter. The known parameter deviation(s) may stem from a cause not associated with the loss of traction of the slip coupling.

In a further embodiment, detecting the loss of traction of the slip coupling may include determining, via the controller, an operating condition of the wind turbine. Additionally, the controller may determine a slip-indication threshold at the operating condition. Additionally, the controller may detect an absolute value of the difference which is greater than or equal to the slip-indication threshold.

In yet a further embodiment, detecting the loss of traction of the slip coupling may include applying, via the controller, a delay correction to the data indicative of the generator operating parameter. The delay correction may compensate for a sampling rate difference between the data indicative of the rotor operating parameter in the data indicative of the generator operating parameter.

In an embodiment, detecting the loss of traction of the slip coupling may include determining, via a calibration module of the controller, a calibration factor for the rotor operating parameter. The controller may apply the calibration factor to the data indicative of the rotor operating parameter.

In an additional embodiment, the rotor operating parameter may correspond to a rotor speed. Additionally, the generator operating parameter may correspond to a generator speed.

In a further embodiment, the method may include receiving a rotational speed of a portion of a high-speed shaft of the drivetrain coupled between the slip coupling and a gearbox of the drivetrain. The method may also include utilizing a gear ratio of the gearbox to determine the rotor speed of the rotor from the rotational speed of the portion of the high-speed shaft.

In yet a further embodiment, the rotor operating parameter may correspond to a rotor inertia. Additionally, the generator operating parameter may correspond to a generator torque.

In an embodiment, determining the degradation value for the slip coupling may also include determining a per-event magnitude threshold for the angle of slip. Additionally, the controller may detect an angle-of-slip magnitude corresponding to the loss of traction for a single event which exceeds the per-event magnitude threshold.

In an additional embodiment, determining the per-event magnitude threshold for the angle of slip may include determining, via the controller, an operating condition of the wind turbine. Additionally, the controller may determine the per-event magnitude threshold for the angle of slip at the operating condition.

In a further embodiment, determining the operating condition of the wind turbine may also include determining, via the controller, a rotor inertia. The controller may also determine a generator torque. Additionally, the controller may determine a torque differential across the slip coupling based on the rotor inertia and the generator torque.

In yet a further embodiment, determining the degradation value for the slip coupling may include adding an absolute value of the angle of slip to a cumulative slip count for the slip coupling oversampling period. The cumulative slip count may be indicative of an accumulation of degrees of slip of the slip coupling over the sampling period.

In an embodiment, the method may include determining an end-of-life wear threshold for the slip coupling based on a wear level at which a likelihood of the loss of traction of the slip coupling exceeds an acceptable limit. The end-of-life wear threshold may be expressed in terms of an accumulated slip angle. Additionally, the controller may detect an approach of the cumulative slip count to the end-of-life wear threshold.

In an additional embodiment, the method may include determining, via the controller, a rate of growth of the cumulative slip in terms of cycle count and/or time. Additionally, the method may include determining an end-of-life wear threshold for the slip coupling based on a wear level at which a likelihood of the loss of traction of the slip coupling exceeds an acceptable limit. The end-of-life wear threshold may be expressed in terms of an accumulated slip angle. Additionally, the controller may forecast a remaining-useful-life of the slip coupling based on the rate of growth of the cumulative slip count and the end-of-life wear threshold.

In a further embodiment, forecasting the remaining-useful-life of the slip coupling may include correlating, via the controller, the rate of growth to an operating condition of the wind turbine at a plurality of time intervals. Additionally, the method may include determining a plurality of forecasted rates of growth based, at least in part, on a plurality of forecasted operating conditions. The controller may also determine a probability of approaching the end-of-life wear threshold at each of the plurality of forecasted rates of growth based on the plurality of forecasted operating conditions.

In another aspect, the present disclosure is directed to a system for controlling a wind turbine. The system may include a rotor having one or more rotor blades mounted thereto and a generator rotatably coupled to the rotor via a slip coupling. The system may also include at least one operational sensor operably coupled to the rotor and configured to monitor a rotor operating parameter of the rotor in operation. Additionally, the system may include a controller communicatively coupled to the generator and the operational sensor(s). The controller may include at least one processor configured to perform a plurality of operations. The plurality of operations may include any of the operations and/or features described herein.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Figure 1:
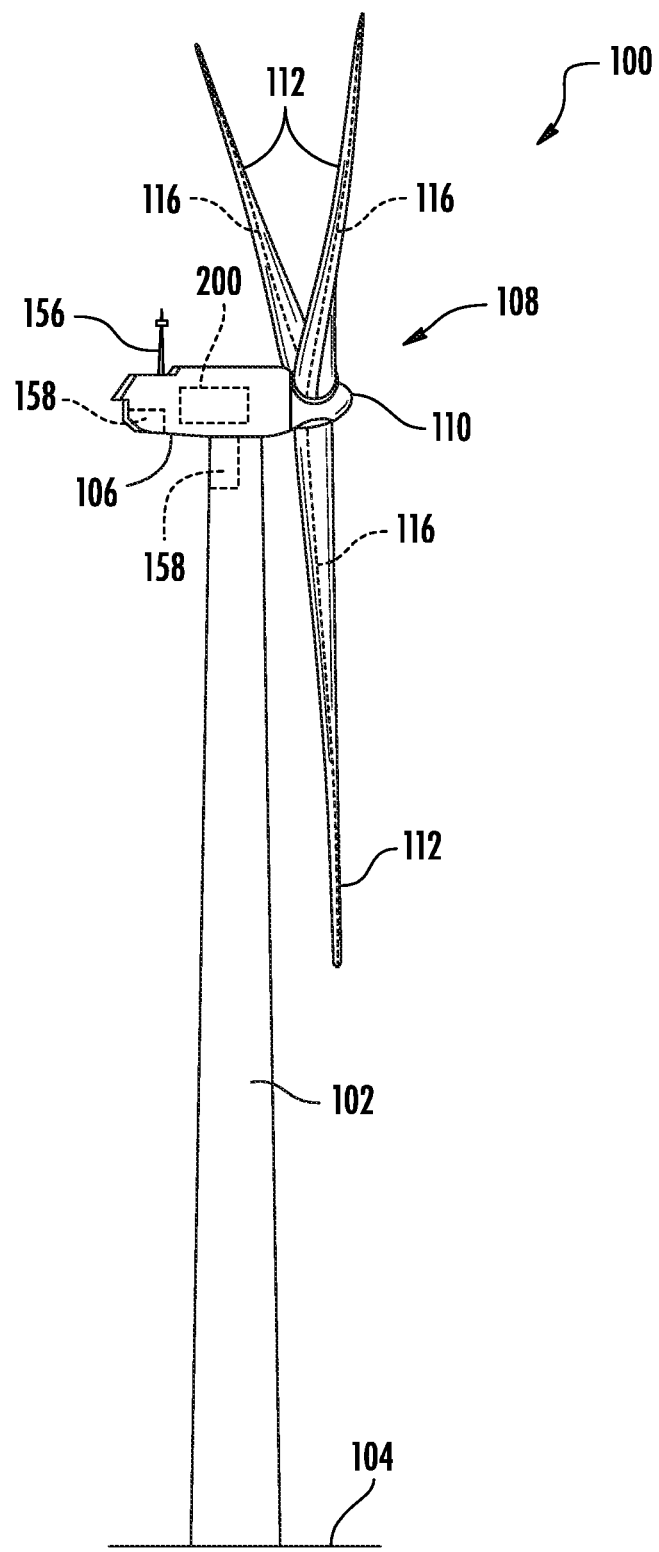
FIG. 1 illustrates a perspective view of one embodiment of a wind turbine according to the present disclosure.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first", "second", and "third" may be used interchangeably to distinguish one component from another and are not intended to signify location or importance of the individual components.

The terms "coupled," "fixed," "attached to," and the like refer to both direct coupling, fixing, or attaching, as well as indirect coupling, fixing, or attaching through one or more intermediate components or features, unless otherwise specified herein.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

Generally, the present disclosure is directed to systems and methods for controlling the wind turbine based, at least in part on a degradation value of a slip coupling. Often, the rotor of the wind turbine may be coupled to the generator of the wind turbine via a slip coupling. The slip coupling may be configured to slip if the torque across the slip coupling (e.g., a torque differential between portions of the driveshaft joined by the support coupling) exceeds a traction threshold for the slip coupling. The slipping of the slip coupling may serve to protect various components of the wind turbine from torque loads exceeding a design limit. For example, generator torque may be employed to slow the rotation of the rotor. Accordingly, the interaction of the generator torque and the inertia of the rotor may exceed the traction of the slip coupling and the slip coupling may begin to slip, as it is designed to do. The slipping of the slip coupling may be detectable based on a difference between a rotor operating parameter (e.g., rotor rotation speed, inertia, etc.) and a generator operating parameter (e.g., generator rotor rotational speed, generator torque, etc.).

The slipping of the slip coupling may result in the wearing/damaging of the slip coupling. However, as the slip coupling is designed to slip, a certain amount of slip and corresponding wear may be acceptable before it may be necessary to service the slip coupling. As such, it may be desirable to determine a degradation value for the slip coupling. The degradation value may correspond to a degree of wear/damage accrued by the slip coupling due to the various slip events over the lifecycle of the slip coupling.

One indicator of the accumulated degradation of the slip coupling may lie in the degrees of slip accumulated across all the slip of events experienced by the slip coupling. In other words, the number of degrees of slip the slip coupling may slip in a particular slip event may be added to a cumulative slip count for the slip coupling. During continued operations of the wind turbine, the cumulative slip count may continue to accrue until a threshold indicative of an unacceptable wear level of the slip coupling is reached.

It should be appreciated that the accumulation of slip counts as described herein may not be obtainable using known methods of monitoring the slip coupling. While known methods of monitoring may indicate an alignment offset (e.g., 10°, 30°, 45°, etc.) of the slip coupling relative to an installed orientation, such an offset does not indicate whether the slip coupling has accumulated more than 360° of slip. In other words, known methods are incapable of indicating whether a 30° offset corresponds only to 30° or whether the offset corresponds to 390°, 750°, and so on. Additionally, the degrees of offset may not account for slips which may occur in opposing directions. For example, a 40° slip in a clockwise direction followed by a 20° slip in a counterclockwise direction may result in an indication of 20° of slip/offset based on known methods, while the utilization of the systems and methods disclosed herein may indicate 60° of accumulated slip.

In addition to the cumulative degrees of slip being indicative of the degradation value, the degradation value may also be based on the number of degrees of slip of the slip coupling during a single slip event. Accordingly, a single slip event which results in a relatively significant number of degrees of slip may be indicative of a failed or failing slip coupling. For example, the slip coupling may be designed to slip a specified number degrees in response to a given torque across a slip coupling. However, if, using the systems methods disclosed herein, the degrees of slip observed in response to the given torque exceed the anticipated degrees of slip, then wear/damage may be indicated. By way of further example, the slip coupling slipping a relatively significant number of degrees in response to a relatively minor torque differential across the slip coupling may be indicative of an unacceptable wear/damage level.

Referring now to the drawings, FIG. 1 illustrates a perspective view of one embodiment of a wind turbine 100 according to the present disclosure. As shown, the wind turbine 100 generally includes a tower 102 extending from a support surface 104, a nacelle 106, mounted on the tower 102, and a rotor 108 coupled to the nacelle 106. The rotor 108 includes a rotatable hub 110 and at least one rotor blade 112 coupled to and extending outwardly from the hub 110. For example, in the illustrated embodiment, the rotor 108 includes three rotor blades 112. However, in an alternative embodiment, the rotor 108 may include more or less than three rotor blades 112. Each rotor blade 112 may be spaced about the hub 110 to facilitate rotating the rotor 108 to enable kinetic energy to be transferred from the wind into usable mechanical energy, and subsequently, electrical energy. For instance, the hub 110 may be rotatably coupled to an electric generator 118 (FIG. 2) of an electrical system 150 (FIG. 2) positioned within the nacelle 106 to permit electrical energy to be produced.

The wind turbine 100 may also include a controller 200 centralized within the nacelle 106. However, in other embodiments, the controller 200 may be located within any other component of the wind turbine 100 or at a location outside the wind turbine. Further, the controller 200 may be communicatively coupled to any number of the components of the wind turbine 100 in order to control the components. As such, the controller 200 may include a computer or other suitable processing unit. Thus, in several embodiments, the controller 200 may include suitable computer-readable instructions that, when implemented, configure the controller 200 to perform various different functions, such as receiving, transmitting and/or executing wind turbine control signals.

Figure 2:
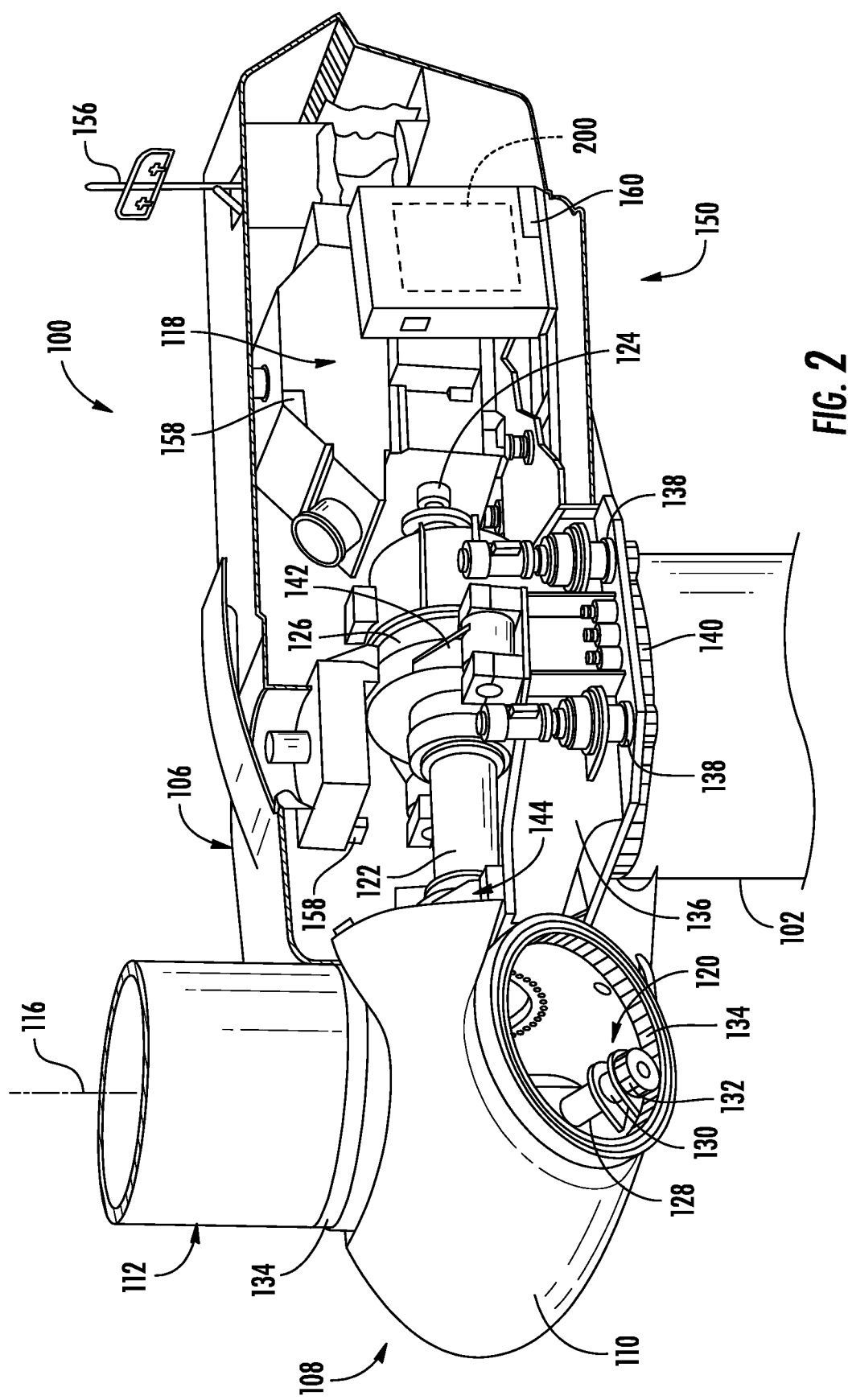
FIG. 2 illustrates a perspective, internal view of one embodiment of a nacelle of the wind turbine according to the present disclosure.
Figure 3:
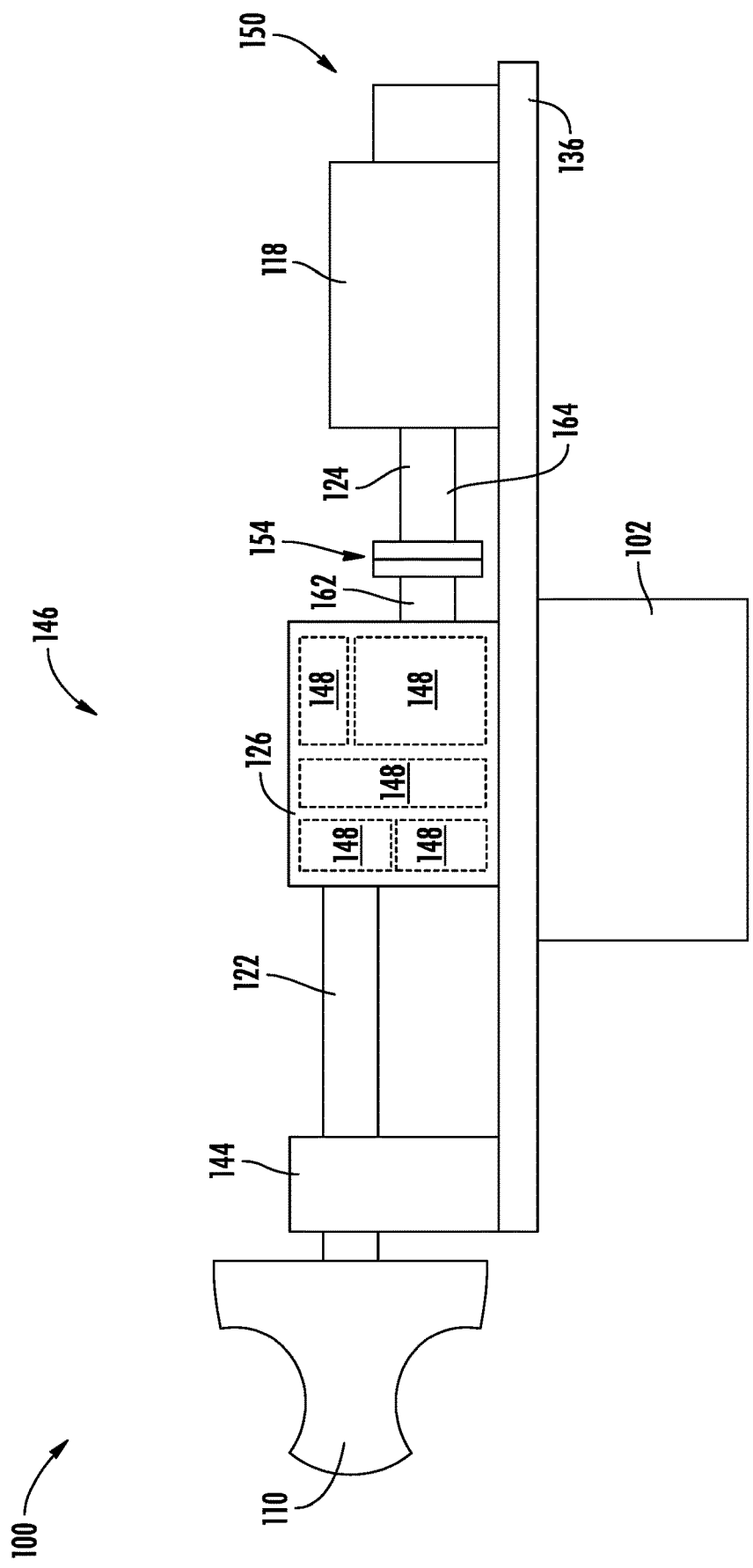
FIG. 3 illustrates a schematic diagram of one embodiment of a drivetrain of the wind turbine according to the present disclosure.

Referring now to FIGS. 2-3, a simplified, internal view of one embodiment of the nacelle 106 and a schematic diagram of one embodiment of a drivetrain 146 of the wind turbine 100 shown in FIG. 1 are illustrated. As shown, the generator 118 may be coupled to the rotor 108 for producing electrical power from the rotational energy generated by the rotor 108. For example, as shown in the illustrated embodiment, the rotor 108 may include a rotor shaft 122 coupled to the hub 110 for rotation therewith. The rotor shaft 122 may be rotatably supported by a main bearing 144. The rotor shaft 122 may, in turn, be rotatably coupled to a high-speed shaft 124 of the generator 118 through an optional gearbox 126 connected to a bedplate support frame 136 by one or more torque arms 142. As is generally understood, the rotor shaft 122 may provide a low-speed, high-torque input to the gearbox 126 in response to rotation of the rotor blades 112 and the hub 110. The gearbox 126 may then be configured with a plurality of gears 148 to convert the low-speed, high-torque input to a high-speed, low-torque output to drive the high-speed shaft 124 and, thus, the generator 118. In an embodiment, the gearbox 126 may be configured with multiple gear ratios so as to produce varying rotational speeds of the high-speed shaft for a given low-speed input, or vice versa.

In an embodiment, the rotor 108 may be slowed via a torque generated by the generator 118. As the generator 118 may generate a torque counter to the rotation of the rotor 108, the high-speed shaft 124 may be equipped with a slip coupling 154. The slip coupling 154 may prevent damage to a component of the drivetrain 146 due to overloading of the drivetrain 146. As such, the slip coupling 154 may have a release threshold, or traction, above which the slip coupling 154 may permit first and second portions 162, 164 of the high-speed shaft 124 to have a different rotational speeds. It should be appreciated that, if the torsional moment at the slip coupling 154 exceeds the release/traction threshold, the generator 118 may be communicatively decoupled from the rotor 108 and a degree of wear may be accumulated by the slip coupling 154. In such an event, the torque developed by the generator 118 may be unavailable to slow the rotor 108 or an increased rotational speed of the rotor 108 may be unavailable for increased power production.

Each rotor blade 112 may also include a pitch control mechanism 120 configured to rotate the rotor blade 112 about its pitch axis 116. Each pitch control mechanism 120 may include a pitch drive motor 128 (e.g., any suitable electric, hydraulic, or pneumatic motor), a pitch drive gearbox 130, and a pitch drive pinion 132. In such embodiments, the pitch drive motor 128 may be coupled to the pitch drive gearbox 130 so that the pitch drive motor 128 imparts mechanical force to the pitch drive gearbox 130. Similarly, the pitch drive gearbox 130 may be coupled to the pitch drive pinion 132 for rotation therewith. The pitch drive pinion 132 may, in turn, be in rotational engagement with a pitch bearing 134 coupled between the hub 110 and a corresponding rotor blade 112 such that rotation of the pitch drive pinion 132 causes rotation of the pitch bearing 134. Thus, in such embodiments, rotation of the pitch drive motor 128 drives the pitch drive gearbox 130 and the pitch drive pinion 132, thereby rotating the pitch bearing 134 and the rotor blade(s) 112 about the pitch axis 116. Similarly, the wind turbine 100 may include one or more yaw drive mechanisms 138 communicatively coupled to the controller 200, with each yaw drive mechanism(s) 138 being configured to change the angle of the nacelle 106 relative to the wind (e.g., by engaging a yaw bearing 140 of the wind turbine 100).

Referring particularly to FIG. 2, in an embodiment, the wind turbine 100 may include an environmental sensor 156 configured for gathering data indicative of one or more environmental conditions. The environmental sensor 156 may be operably coupled to the controller 200. Thus, in an embodiment, the environmental sensor(s) 156 may, for example, be a wind vane, an anemometer, a lidar sensor, thermometer, barometer, or any other suitable sensor. The data gathered by the environmental sensor(s) 156 may include measures of wind speed, wind direction, wind shear, wind gust, wind veer, atmospheric pressure, and/or temperature. In at least one embodiment, the environmental sensor(s) 156 may be mounted to the nacelle 106 at a location downwind of the rotor 108. The environmental sensor(s) 156 may, in alternative embodiments, be coupled to, or integrated with, the rotor 108. It should be appreciated that the environmental sensor(s) 156 may include a network of sensors and may be positioned away from the turbine 100.

In addition, the wind turbine 100 may include a at least one operational sensor 158. The operational sensor(s) 158 may be configured to detect a performance of the wind turbine 100 (e.g. in response to the environmental conditions). For example, the operational sensor(s) 158 may be a rotational speed sensor operably coupled to the controller 200. The operational sensor(s) 158 may be directed at the rotor 108 of the wind turbine 100, the rotor shaft 122 of the wind turbine 100 and/or the generator 118. The operational sensor(s) 158 may gather data indicative of the rotational speed and/or rotational position of the rotor shaft 122, and thus the rotor 108 in the form of a rotor speed and/or a rotor azimuth. The operational sensor(s) 158 may, in an embodiment, be an analog tachometer, a D.C. tachometer, an A.C. tachometer, a digital tachometer, a contact tachometer a non-contact tachometer, or a time and frequency tachometer. In an embodiment, the operational sensor(s) 158 may, for example, be an encoder, such as an optical encoder. For example, the operational sensor(s) 158 may be configured to monitor the speed of the rotor 108 based on a passage of a rotating feature, such as a plurality of bolts securing the hub 110 to the rotor shaft 122. In an additional embodiment, the operational sensor(s) 158 may be at least one accelerometer coupled to a portion of the rotor 108, such as the rotor blade(s) 112.

Figure 5:
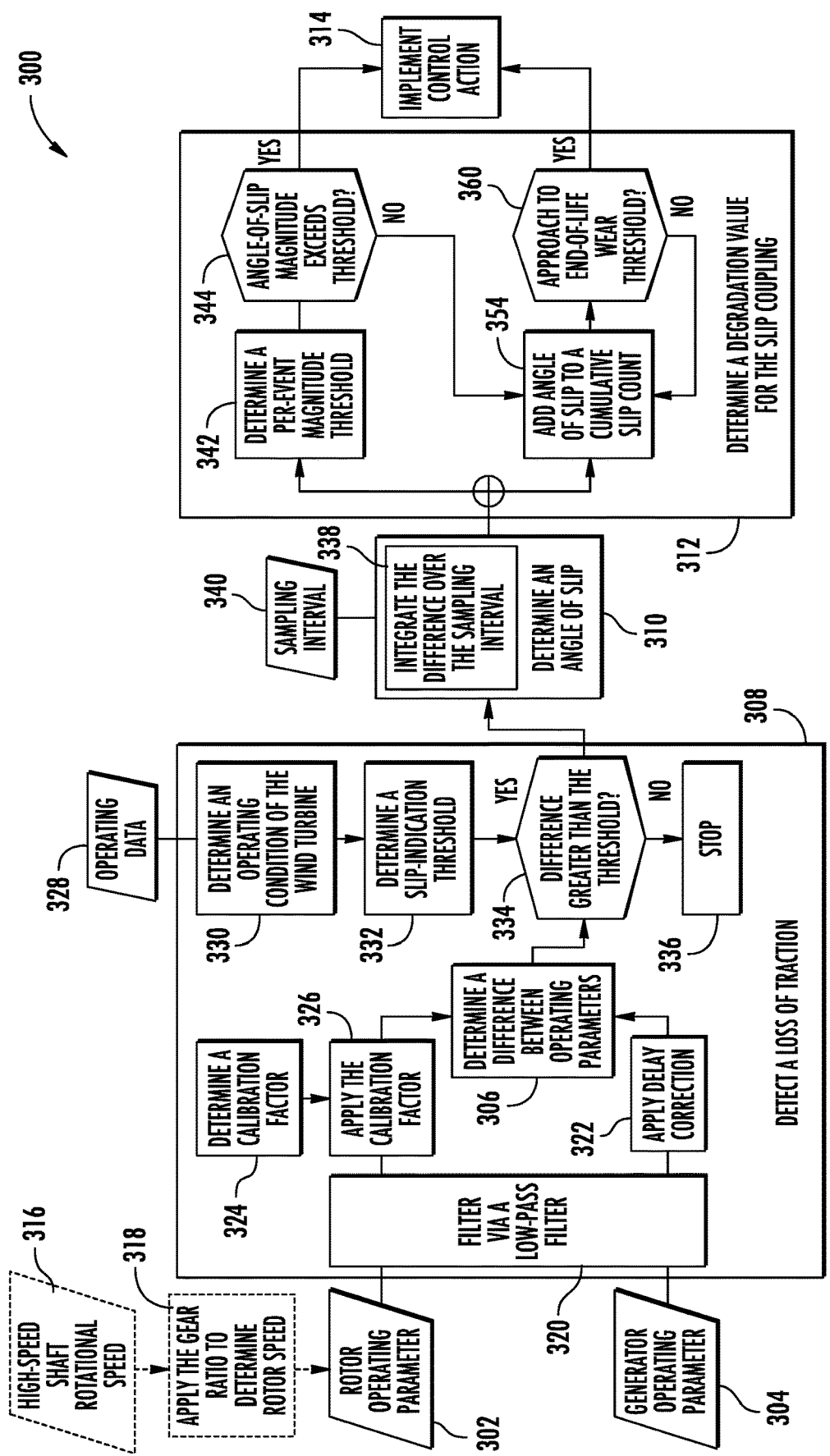
FIG. 5 illustrates a flow diagram of one embodiment of a control logic of a system for controlling a wind turbine according to the present disclosure.

In an embodiment, the operational sensor(s) 158 and/or environmental sensor(s) 156 may be configured to monitor operating parameters of wind turbine 100 so as to generate operating data 328 (FIG. 5). For example, the operational sensor(s) 158 and/or environmental sensor(s) 156 may monitor at least one of wind speed, wind direction, the power output of the generator 118, and/or an operating state of the wind turbine 100.

It should also be appreciated that, as used herein, the term "monitor" and variations thereof indicates that the various sensors of the wind turbine 100 may be configured to provide a direct measurement of the parameters being monitored or an indirect measurement of such parameters. Thus, the sensors described herein may, for example, be used to generate signals relating to the parameter being monitored, which can then be utilized by the controller 200 to determine a condition or response of the wind turbine 100.

Figure 4:
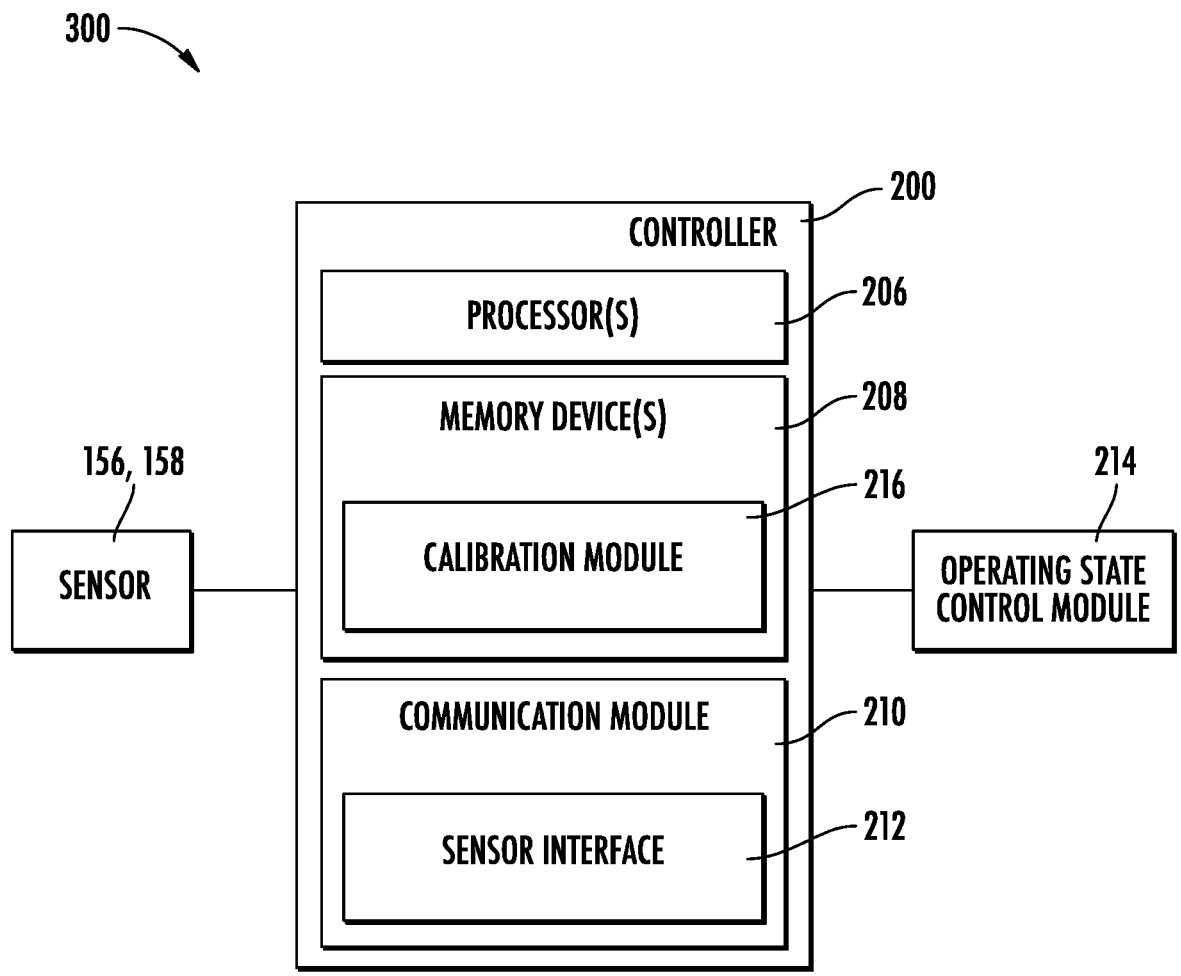
FIG. 4 illustrates a block diagram of one embodiment of a controller for use with the wind turbine according to the present disclosure.
Figure 6:
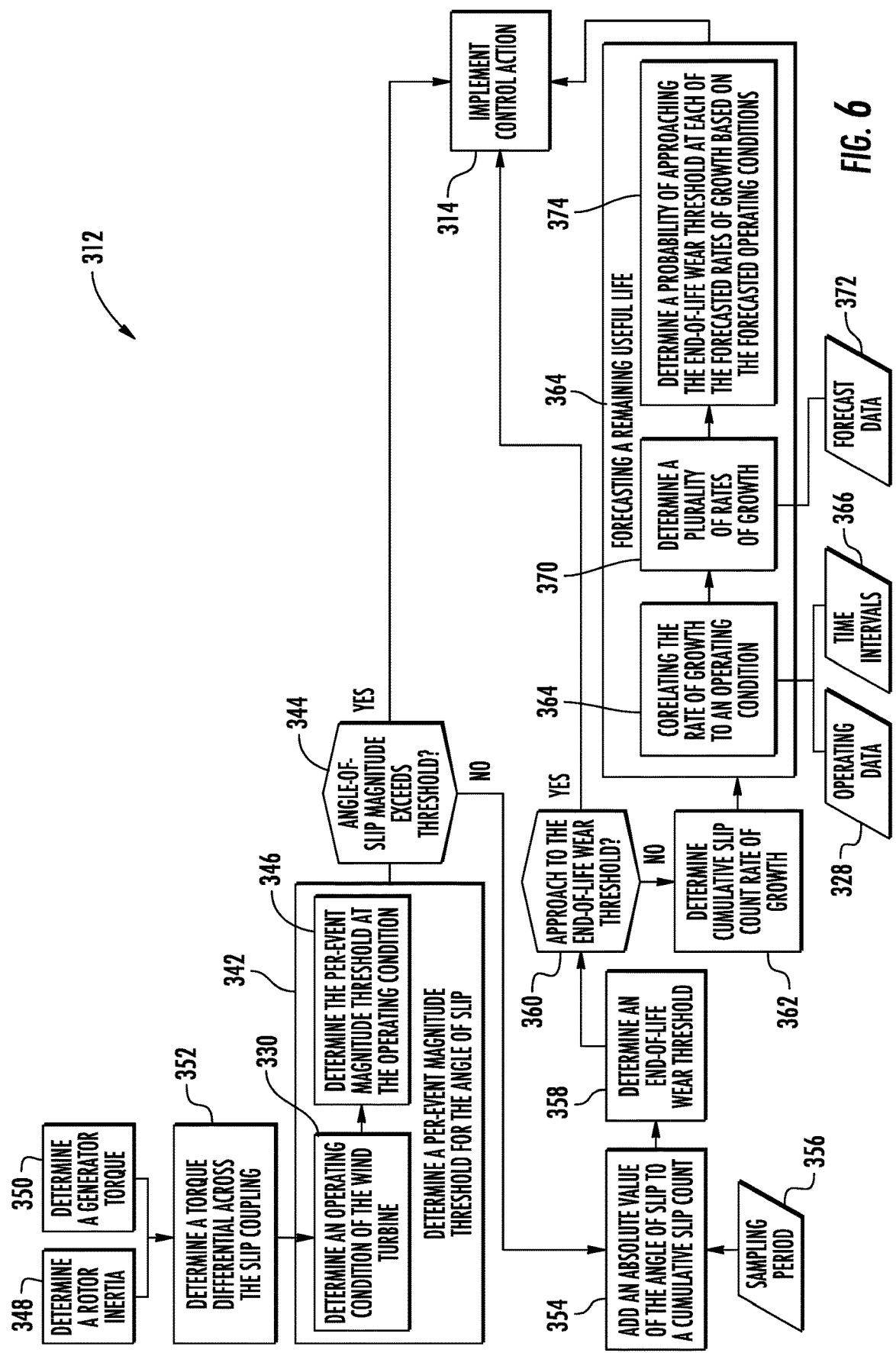
FIG. 6 illustrates a flow diagram of one embodiment of a portion of the control logic of FIG. 5 corresponding to the determination of a degradation value for the slip coupling according to the present disclosure.

Referring now to FIGS. 4-6, multiple embodiments of a system 300 for controlling the wind turbine 100 according to the present disclosure are presented. As shown particularly in FIG. 4, a schematic diagram of one embodiment of suitable components that may be included within the system 300 is illustrated. For example, as shown, the system 300 may include the controller 200 communicatively coupled to the operational sensor(s) 158 and/or environmental sensor(s) 156. Further, as shown, the controller 200 includes one or more processor(s) 206 and associated memory device(s) 208 configured to perform a variety of computer-implemented functions (e.g., performing the methods, steps, calculations and the like and storing relevant data as disclosed herein). Additionally, the controller 200, may also include a communications module 210 to facilitate communications between the controller 200, and the various components of the wind turbine 100. Further, the communications module 210 may include a sensor interface 212 (e.g., one or more analog-to-digital converters) to permit signals transmitted from the sensor(s) 156, 158 to be converted into signals that can be understood and processed by the processors 206. It should be appreciated that the sensor(s) 156, 158 may be communicatively coupled to the communications module 210 using any suitable means. For example, the sensor(s) 156, 158 may be coupled to the sensor interface 212 via a wired connection. However, in other embodiments, the sensor(s) 156, 158 may be coupled to the sensor interface 212 via a wireless connection, such as by using any suitable wireless communications protocol known in the art. Additionally, the communications module 210 may also be operably coupled to an operating state control module 214 configured to change at least one wind turbine operating state.

As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 208 may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 208 may generally be configured to store suitable computer-readable instructions that, when implemented by the processor(s) 206, configure the controller 200 to perform various functions including, but not limited to, detecting a loss of traction, determining an angle of slip corresponding to the loss of traction, determining a degradation value for the slip coupling 154, and implementing a control action based, at least in part, on the degradation value. as described herein, as well as various other suitable computer-implemented functions.

Referring particularly to FIG. 5, in an embodiment, the controller 200 may be configured to receive data indicative of a rotor operating parameter 302 and data indicative of a generator operating parameter 304. A difference 306 between the data indicative of the rotor operating parameter 302 and the data indicative of the generator operating parameter 304 may then be determined by the controller 200. Based on the difference 306, the controller 200 may detect a loss of traction 308 of the slip coupling 154. In response to the detection of the loss of traction 308, the controller 200 may, in an embodiment, determine an angle of slip 310 as a function of the difference 306. Based, at least partially, on the angle of slip 310, a degradation value 312 for the slip coupling 154 may be determined. Additionally, a control action 314 may be implemented based on the determined degradation value 312.

In an embodiment, the rotor operating parameter 302 may correspond to a rotor speed. In other words, the rotor operating parameter 302 may correspond to a rotational velocity of the rotor 108 of the wind turbine 100. The rotor speed may be monitored by the operational sensor(s) 158. For example, the operational sensor(s) 158 may be an inertial measurement unit, or similar sensor, coupled to a portion of the rotor 108. However, the operational sensor(s) 158 may, in an embodiment, be an optical sensor configured to determine the rotor speed based on the rate at which a feature, such as a bolt or plurality of bolts passes through the sensor field of the operational sensor(s) 158.

The rotor speed of the rotor 108 may, in an embodiment, be extrapolated from data monitored by the operational sensors 158. For example, the controller 200 may be configured to receive data indicative of a high-speed shaft rotational speed 316. The high-speed shaft rotational speed 316 may correspond to a rotational speed of a portion of the high-speed shaft 124 coupled between the slip coupling 154 and the gearbox 126 of the drivetrain 146, such as the first portion 162 of the high-speed shaft 124. As depicted at 318, the gear ratio of the gearbox 126 may be utilized to determine the rotor speed (e.g. rotor operating parameter 302) of the rotor 108 from the rotational speed of the portion of the high-speed shaft 124. In an additional embodiment, the rotational speed of the portion of the high-speed shaft 124 may serve as the rotor operating parameter 302.

In an embodiment wherein the rotor operating parameter 302 corresponds to the rotor speed, the generator operating parameter 304 may correspond to a generator speed. In other words, the generator operating parameter 304 may correspond to a rotational velocity of the generator rotor of the generator 118 and may be monitored by the operational sensor(s) 158.

In an embodiment, the rotor operating parameter 302 may correspond to a rotor inertia. The rotor inertia may be monitored directly by the operational sensor(s) 158 and/or computed by the controller 200 based on indications of the performance of the wind turbine 100. In such an embodiment, the generator operating parameter 304 may correspond to a generator torque. The generator torque may similarly be monitored directly by the operational sensor(s) 158 and/or determined by the controller 200 based on other indications of the performance of the generator 118 (e.g., power output), generator setpoints, and/or converter setpoints.

Detecting the loss of traction 308 of the slip coupling 154 may, in an embodiment, include filtering the data indicative of the rotor operating parameter 302 and the generator operating parameter 304 via a low-pass filter 320. In other words, filtering the data may preclude the inclusion of at least one known parameter deviation from the determination of the difference 306. The known parameter deviation(s) may correspond to a cause not associated with the loss of traction of the slip coupling. For example, the low-pass filter 320 may, in an embodiment, be configured to filter out certain drive train dynamics and/or sensor noise, which may include frequency components due to sample-and-hold. In an embodiment, the low-pass filter 320 may be configured to filter out frequency components greater than or equal to three times the rotational velocity of the rotor 108 (e.g., 3P).

The utilization of the low-pass filter 320 may filter, or correct, for sources of known or predictable variation between the rotor and generator operating parameters 302, 304 such that the controller 200 may distinguish between signal-to-noise and even small angles events. Accordingly, the signal processing via the low-pass filter 320 may be employed by the system 300 to achieve much higher signal-to-noise ratio, and therefore much more accurate estimate of slip at a given rate of false positives, than systems lacking the signal processing disclosed herein. As such, the signal processing via the low-pass filter 320 may facilitate the detection of slip events during wind turbine 100 startup and shutdown phases, which may not be detectable using conventional means.

It should be appreciated that the signal processing via the low-pass filter 320 may account for known sources of variation between the rotor operating parameter 302 and the generator operating parameter 304. Accordingly, variations between the rotor and generator operating parameters 302, 304 remaining following the signal processing may be indicative of a slip event. It should further be appreciated that, as depicted in FIG. 5, a single low-pass filter 320 may be employed to filter both the rotor and generator operating parameters 302, 304.

The data indicative of rotor operating parameter 302 and the data indicative of the generator operating parameter 304 may be generated at different sampling rates. For example, in an embodiment, the rotor operating parameter 302 may be generated at a first sampling rate while the generator operating parameter may be generated at a second sampling rate. In an embodiment, the second sampling rate may, for example, be more frequent than the first sampling rate. In an embodiment, the difference in sampling rates may be due to differences in how the rotor and generator operating parameters 302, 304 are obtained. For example, in an embodiment, the data indicative of generator speed may be of a higher fidelity than the data indicative of the rotor speed. Additionally, in an embodiment, the data indicative of the rotor speed may include an inherent delay. The inherent delay may be attributable to the processing/conversion of raw sensor data into the rotor speed.

In order to compensate for sampling rate differences between the rotor and generator operating parameters 302, 304, the controller 200 may, in an embodiment, apply a delay correction 322 to either the rotor operating parameter 302 or the generator operating parameter 304. For example, in an embodiment, the controller 200 may apply the delay correction 322 to the data indicative of the generator operating parameter 304 having the second sampling rate which is greater than the first sampling rate of the data indicative of the rotor operating parameter 302. In an embodiment, the delay correction 322 may have a constant value. However, in an additional embodiment, the delay correction 322 may vary with the rotor or generator operating parameter 302, 304. For example, the delay correction 322 may, in an embodiment the inversely proportional to the rotor speed.

It should be appreciated that, in an embodiment, the delay correction 322 may be employed to suppress a portion of the data generated at the higher of the first or second sampling rate. Similarly, in an embodiment, the delay correction 322 may be employed to extend a portion of the data generated at the lower of the first or second sampling rate. Suppressing or extending a portion of the data may facilitate the determination of the difference 306 based on concurrently obtained data indicative of the rotor and generator operating parameters 302, 304. Accordingly, it should further be appreciated that the application of the delay correction 322 may ensure that the difference 306 corresponds to a difference between the rotor and generator operating parameters 302, 304 at the same instant rather than being an artifact of differences in the sampling rates.

In an embodiment, the controller 200 may include a calibration module 216. Accordingly, in an embodiment, the calibration module may be employed to determine a calibration factor 324 for the rotor operating parameter 302. As depicted at 326, the calibration factor may then be applied via the controller 200 to the data indicative of the rotor operating parameter 302. The calibration factor 324 may correct for a bias between the rotor operating parameter 302 and the generator operating parameter 304. For example, the calibration factor 324 may correspond to an uncertainty in gearbox ratio.

In an embodiment, the bias may result from the methods used to gather the data indicative of the rotor operating parameter 302 and may, therefore, correspond to a difference between an actual and a monitored operating parameter. For example, in an embodiment wherein the rotor operating parameter 302 corresponds to the rotor speed, the measured rotor speed may deviate from the actual rotor speed as may be determined by other monitoring means. In such an embodiment, the calibration factor 324 may be employed to bring the measured rotor speed into alignment with the actual rotor speed. Accordingly, the calibration factor may be determined based on historical monitoring of the wind turbine 100. For example, in an embodiment wherein the operational sensor(s) 158 is an optical sensor, differences or discrepancies in the spacing of the bolt pattern coupling the rotor 108 to the rotor shaft 122 may result in deviations in the apparent rotational speed of the rotor 108.

In an embodiment, the calibration factor 324 may be derived from an exponential moving average of a parameter derived from the rotor and generator operating parameters 302, 304. In such an embodiment, the utilization of the exponential moving average may reduce the data complexity surrounding the calibration factor 324 and, therefore increase the efficiency of the system 300.

In order to determine whether the difference 306 is indicative of a slip of the slip coupling 154, the controller 200 may, in an embodiment, be configured to receive operating data 328 from the environmental and/or operational sensors 156, 158. Based on the received operating data 328, the controller 200 may determine an operating condition 330 of the wind turbine 100. The controller 200 may then, in an embodiment, determine a slip-indication threshold 332 at the operating condition 330. The slip-indication threshold 332 may thus vary in accordance with the operating condition 330. As depicted at 334, the controller 200 may determine whether the difference 306 is greater than the slip-indication threshold 332. As depicted at 336, in an embodiment wherein the difference 306 is not greater than the slip indication threshold 332, the methods disclosed herein may halt, with the difference 306 being attributable to a cause other than the slipping of the slip coupling 154. However, in an embodiment wherein the difference 306 is greater than or equal to the slip-indication threshold 332, slip may be indicated and the angle of slip 310 may be determined. It should be appreciated that the utilization of the slip-indication threshold 332 may serve to isolate known causes of differences between the rotor and generator operating parameter 302, 304 not attributable to slip during certain operating conditions 330 of the wind turbine. This isolation may result in the corresponding differences 306 being excluded from the determination of the degradation value 312 for the slip coupling 154.

As depicted at 338, the controller 200 may, in an embodiment, be configured to integrate the difference 306 over a sampling interval 340 since the number of degrees that the slip coupling 154 slips may be the integral of the difference between the rotor and generator operating parameters 302, 304. Accordingly, by integrating the difference 306 over the sampling interval 318, the controller 200 may determine the angle of slip 310 corresponding to the loss of traction 308. By way of example, in an embodiment wherein the rotor and generator operating parameters 302, 304 correspond to rotational speeds, the rotational speed may be measured in degrees per second. As such, integrating the absolute value of the difference 306 over the sampling interval 340 may output the angle of slip 310 during the sampling interval 340. In other words, the controller 200 may, via the integration, convert the difference 306 between rotor speed a rotor speed and a generator speed into the number of degrees (as an absolute value) by which the slip coupling 154 has slipped during a particular slip event.

Referring still to FIG. 5, and also to FIG. 6, in an embodiment, determining the degradation value 312 may include determining a per-event magnitude threshold 342 for the angle of slip 310. The per-event magnitude threshold 342 may correspond to a maximum number of degrees by which the slip coupling 154 may slip during a single slip event without directly necessitating the implementation of the control action 314. Accordingly, the controller 200 may, in an embodiment, detect an angle-of-slip magnitude 344 corresponding to a loss of traction for a single event which exceeds the per-event magnitude threshold 342.

In an embodiment, the per-event magnitude threshold 342 may vary depending on the operating condition 330 of the wind turbine 100. In other words, the maximum number of degrees by which the slip coupling 154 may slip during a single slip event may be greater during certain operating conditions 330 than during others. For example, the per-event magnitude threshold 342 may be greater during an emergency braking of the rotor 108 and/or an extreme turbulence event. In contrast, the per-event magnitude threshold 342 may be relatively lower during standard operations, such as during nominal turbine operations, start up operations, and/or idling/parking operations. Accordingly, in an embodiment, the controller 200 may determine the operating condition 330 of the wind turbine 100. As depicted at 346, the controller then may determine/specify the per-event magnitude threshold 342 for the angle of slip 310 at the operating condition 330.

In order to determine the operating condition 330 underpinning the per-event magnitude threshold 342, the controller 200 may, in an embodiment determine a rotor inertia 348 and a generator torque 350. The controller 200 may then determine a torque differential 352 across the slip coupling 154 based on the rotor inertia 348 and the generator torque 350. As such, the per-event magnitude threshold 342 may correspond to the maximum number of degrees by which the slip coupling 154 may slip in response to a specific torque differential 352 across the slip coupling 154. For example, in an embodiment, the slip coupling 154 slipping a relatively significant number of degrees in response to a relatively insignificant torque differential 352 may be indicative of wear/damage of the slip coupling 154.

As depicted in FIGS. 5 and 6, in an embodiment wherein the angle-of-slip magnitude 344 does not exceed the per-event magnitude threshold 342 or the per-event magnitude threshold 342 is not employed by the system 300, the determination of the degradation value 312 may include adding an absolute value of the angle of slip 310 to a cumulative slip count 354 over a sampling period 356. The sampling period 356 may, for example, correspond to an elapsed period since the installation of the slip coupling 154 and/or a maintenance activity performed on the drivetrain 146. As such, the cumulative slip count 354 may be indicative of an accumulated degrees of slip of the slip coupling 154 over the sampling period 356. It should be appreciated that the accumulation of degrees of slip of the slip coupling 154 may correspond to a wearing/degradation of the slip coupling 154.

It should further be appreciated that, in an embodiment, the angle of slip 310 may be converted into a damage coefficient by the controller 200. The damage coefficient may be indicative of a degree of damage/wear incurred by the slip coupling 154 during the slip event. Accordingly, in such an embodiment, the determination of the degradation value 312 may include adding the damage coefficient to a cumulative damage value over the sampling period 356.

The increasing of the cumulative slip count 354 may, in an embodiment, be indicative of a reduction in the remaining useful life of the slip coupling 154. To put it another way, as the slip coupling 154 accumulates degrees of slip, the slip coupling 154 may accumulate wear and approach a point at which service/replacement may be required. Accordingly, in an embodiment, an end-of-life wear threshold 358 may be determined for the slip coupling 154. The end-of-life wear threshold 358 may correspond to a wear level at which a likelihood of the loss of traction of the slip coupling 154 exceeds an acceptable limit.

In an embodiment, the of the end-of-life wear threshold 358 may be established based on an engineering data set and thus an engineering diagnostic expert system. The engineering diagnostic expert system may include manifestations of the engineering domain knowledge, such as troubleshooting guides, anomaly validation reports, after-action reports, design specifications, testing reports, and/or other captures of the experience and decision-making knowledge of a human expert.

As depicted at 360, the controller 200 may detect an approach of the cumulative slip count 354 to the end-of-life wear threshold 358. In an embodiment wherein the cumulative slip count 354 crosses or exceeds the end-of-life wear threshold 358, the control action 314 may be implemented. It should be appreciated that the end-of-life wear threshold 358 may be expressed in degrees or radians as an accumulated slip angle.

In an embodiment wherein the cumulative slip count 354 does not meet or exceed the end-of-life wear threshold 358, the controller 200 may continue adding the absolute value of the angle of slip 310 to the cumulative slip count 354.

The controller 200 may, in an embodiment, determine a rate of growth 362 of the cumulative slip count 354 in terms of cycle count and/or time. The controller 200 may then be configured to forecast a remaining useful life 364 of the slip coupling 154 based on the rate of growth 362 of the cumulative slip count 354 and the end-of-life wear threshold 358. For example, the controller 200 may determine the rate of growth 362 as a function of a cycle count. Based on this determination, the controller 200 may forecast the number of operational cycles/hours/days/etc. remaining until the cumulative slip count 354 may be expected to meet or exceed the end-of-life wear threshold 358. This forecast may, for example, facilitate the scheduling of a maintenance activity, and/or inform a decision-making cycle concerning the employment utilization of the wind turbine 100.

As depicted at 366, forecasting the remaining useful life 364 may include correlating the rate of growth 362 to at least one operating condition 330 of the wind turbine 100 at a plurality of time intervals 368. The correlation may indicate that the rate of growth 362 is greater during certain time intervals 368 then during other time intervals 368. For example, the correlation may indicate that the rate of growth 362 is greater during the winter months in a particular location than during the summer months. By way of further example, the correlation may indicate that the rate of growth 362 is greater during daylight hours than during periods of darkness. Further, the correlation may indicate that the rate of growth 362 is greater during a transition of the wind turbine 100 between operating states (e.g., a transition from an operational state to an idled state and vice a versa).

In an embodiment, the controller 200 may utilize the correlation of the rate of growth 362 to the operating condition(s) 330 to determine a plurality of forecasted rates of growth 370. The plurality of forecasted rates of growth 370 may be based, at least in part, on a plurality of forecasted operating conditions. The plurality of forecasted operating conditions may be indicated by at least one forecasted data set 372. The controller 200 may then determine a probability 374 of approaching the end-of-life wear threshold 358 at each of the plurality of forecasted rates of growth 370 based on the plurality of forecasted operating conditions. It should be appreciated that each of the probabilities 374 may form a confidence interval which may indicate a percentage likelihood of reaching the end-of-life wear threshold 358 should the particular forecasted operating conditions be manifest. This confidence interval may, for example, facilitate the scheduling of a maintenance activity, and/or inform a decision-making cycle concerning the employment utilization of the wind turbine 100.

In an embodiment, the system 300 may implement a control action 314 based on the degradation value 312 for the slip coupling 154. For example, in an embodiment, the control action 314 may include generating an alarm. The generation of the alarm may facilitate the scheduling of a maintenance event in order to address the indicated wear/damage of the slip coupling 154. Accordingly, the alarm may include an auditory signal, a visual signal, an alert, a notification, a system input, and/or any other system which may identify the root cause to an operator. It should be appreciated that the control action 314 as described herein may further include any suitable command or constraint by the controller 200. For example, in an embodiment, the control action 314 may include temporarily de-rating the wind turbine 100. Additionally, in an embodiment, the control action 314 may include limiting an operation of at least one component of the wind turbine 100. For example, the control action 314 may limit a pitching of a rotor blade 112 and/or a yawing of the nacelle 106 of the wind turbine 100.

Furthermore, the skilled artisan will recognize the interchangeability of various features from different embodiments. Similarly, the various method steps and features described, as well as other known equivalents for each such methods and feature, can be mixed and matched by one of ordinary skill in this art to construct additional systems and techniques in accordance with principles of this disclosure. Of course, it is to be understood that not necessarily all such objects or advantages described above may be achieved in accordance with any particular embodiment. Thus, for example, those skilled in the art will recognize that the systems and techniques described herein may be embodied or carried out in a manner that achieves or optimizes one advantage or group of advantages as taught herein without necessarily achieving other objects or advantages as may be taught or suggested herein.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

Further aspects of the invention are provided by the subject matter of the following clauses:

Clause 1. A method for controlling a wind turbine, the wind turbine having a drivetrain comprising a rotor, having one or more rotor blades mounted thereto, rotatably coupled to a generator via a slip coupling, the method comprising: detecting, via a controller, a loss of traction of the slip coupling based on a difference between data indicative of a rotor operating parameter and data indicative of a generator operating parameter; determining, via the controller, an angle of slip corresponding to the loss of traction as a function of the difference; determining a degradation value for the slip coupling corresponding, at least partially, to the angle of slip; and implementing a control action based on the degradation value.

Clause 2. The method of clause 1, wherein determining the angle of slip corresponding to the loss of traction as a function of the difference further comprises: integrating, via the controller, the difference over a sampling interval to determine the angle of slip corresponding to the loss of traction.

Clause 3. The method of any preceding clause, wherein detecting the loss of traction of the slip coupling further comprises: receiving, via the controller, the data indicative of the rotor operating parameter and the data indicative of the generator operating parameter; filtering the data indicative of the rotor operating parameter and the data indicative of the generator operating parameter via a low-pass filter, wherein filtering the data precludes an inclusion of at least one known parameter deviation from the determination of the difference between the data indicative of the rotor operating parameter and the data indicative of the generator operating parameter, the at least one known parameter deviation resulting from a cause not associated with the loss of traction of the slip coupling.

Clause 4. The method of any preceding clause, wherein detecting the loss of traction of the slip coupling further comprises: determining, via the controller, an operating condition of the wind turbine; determining, via the controller, a slip-indication threshold at the operating condition; and detecting, via the controller, an absolute value of the difference which is greater than or equal to the slip-indication threshold.

Clause 5. The method of any preceding clause, wherein detecting the loss of traction of the slip coupling further comprises: applying, via the controller, a delay correction to the data indicative of the generator operating parameter, wherein the delay correction compensates for a sampling rate difference between the data indicative of the rotor operating parameter and the data indicative of the generator operating parameter.

Clause 6. The method of any preceding clause, wherein detecting the loss of traction of the slip coupling further comprises: determining, via a calibration module of the controller, a calibration factor for the rotor operating parameter; and applying, via the controller, the calibration factor to the data indicative of the rotor operating parameter.

Clause 7. The method of any preceding clause, wherein the rotor operating parameter corresponds to a rotor speed, and wherein the generator operating parameter corresponds to a generator speed.

Clause 8. The method of any preceding clause, further comprising: receiving, via the controller, data indicative of a rotational speed of a portion of a high-speed shaft of the drivetrain coupled between the slip coupling and a gearbox of the drivetrain; and utilizing a gear ratio of the gearbox to determine the rotor speed of the rotor from the rotational speed of the portion of the high-speed shaft.

Clause 9. The method of any preceding clause, wherein the rotor operating parameter corresponds to a rotor inertia, and wherein the generator operating parameter corresponds to a generator torque.

Clause 10. The method of any preceding clause, wherein determining the degradation value for the slip coupling further comprises: determining a per-event magnitude threshold for the angle of slip; detecting, via the controller, an angle-of-slip magnitude corresponding to the loss of traction for a single event which exceeds the per-event magnitude threshold.

Clause 11. The method of any preceding clause, wherein determining the per-event magnitude threshold for the angle of slip further comprises: determining, via the controller, an operating condition of the wind turbine; determining, via the controller, the per-event magnitude threshold for the angle of slip at the operating condition.

Clause 12. The method of any preceding clause, wherein determining the operating condition of the wind turbine further comprises: determining, via the controller, a rotor inertia; determining, via the controller, a generator torque; and determining, via the controller, a torque differential across the slip coupling based on the rotor inertia and the generator torque.

Clause 13. The method of any preceding clause, wherein determining the degradation value for the slip coupling further comprises: adding an absolute value of the angle of slip to a cumulative slip count for the slip coupling over a sampling period, wherein the cumulative slip count is indicative of an accumulation of degrees of slip of the slip coupling over the sampling period.

Clause 14. The method of any preceding clause, further comprising: determining an end-of-life wear threshold for the slip coupling based on a wear level at which a likelihood of the loss of traction of the slip coupling exceeds an acceptable limit, the end-of-life wear threshold being expressed in terms of an accumulated slip angle; and detecting, via the controller, an approach of the cumulative slip count to the end-of-life wear threshold.

Clause 15. The method of any preceding clause, further comprising: determining, via the controller, a rate of growth of the cumulative slip count in terms of at least one of cycle count and time; determining an end-of-life wear threshold for the slip coupling based on a wear level at which a likelihood of the loss of traction of the slip coupling exceeds an acceptable limit, the end-of-life wear threshold being expressed in terms of an accumulated slip angle; forecasting, with the controller, a remaining useful life of the slip coupling based on the rate of growth of the cumulative slip count and the end-of-life wear threshold.

Clause 16. The method of any preceding clause, wherein forecasting the remaining useful life of the slip coupling further comprises: correlating, via the controller, the rate of growth to an operating condition of the wind turbine at a plurality of time intervals; determining a plurality of forecasted rates of growth based, at least in part, on a plurality of forecasted operating conditions; and determining, via the controller, a probability of approaching the end-of-life wear threshold at each of the plurality of forecasted rates of growth based on the plurality of forecasted operating conditions.

Clause 17. A system for controlling a wind turbine, the system comprising: a rotor having one or more rotor blades mounted thereto; a generator rotatably coupled to the rotor via a slip coupling; at least one operational sensor operably coupled to the rotor and configured to monitor a rotor operating parameter of the rotor in operation; and a controller communicatively coupled to the generator and the at least one operational sensor, the controller comprising at least one processor configured to perform a plurality of operations, the plurality of operations comprising: detecting a loss of traction of the slip coupling based on a difference between data indicative of a rotor operating parameter and data indicative of a generator operating parameter; integrating the difference over a sampling interval to determine an angle of slip corresponding to the loss of traction; determining a degradation value for the slip coupling corresponding, at least partially, to the angle of slip; and implementing a control action based on the degradation value.

Clause 18. The system of any preceding clause, wherein determining the loss of traction of the slip coupling further comprises: receiving the data indicative of the rotor operating parameter and the data indicative of the generator operating parameter; filtering the data indicative of the rotor operating parameter and the data indicative of the generator operating parameter via a low-pass filter, wherein filtering the data precludes an inclusion of at least one known parameter deviation cause in the determination of the difference between the data indicative of the rotor operating parameter and the data indicative of the generator operating parameter.

Clause 19. The system of any preceding clause, wherein determining the degradation value for the slip coupling further comprises: determining an operating condition of the wind turbine, wherein determining the operating condition comprises: determining a rotor inertia, determining a generator torque, and determining a torque differential across the slip coupling based on the rotor inertia and the generator torque; determining a per-event magnitude threshold for the angle slip at the operating condition; and detecting an angle-of-slip magnitude corresponding to the loss of traction for a single event which exceeds the per-event magnitude threshold.

Clause 20. The system of any preceding clause, wherein determining the degradation value for the slip coupling further comprises: adding an absolute value of the angle of slip to a cumulative slip count for the slip coupling over a sampling period, wherein the cumulative slip count is indicative of an accumulation of degrees of slip of the slip coupling over the sampling period; determining an end-of-life wear threshold for the slip coupling based on a wear level at which a likelihood of the loss of traction of the slip coupling exceeds an acceptable limit, the end-of-life wear threshold being expressed in terms of an accumulated slip angle; and detecting an approach of the cumulative slip count to the end-of-life wear threshold.

What is claimed is:

1. A method for controlling a wind turbine, the wind turbine having a drivetrain comprising a rotor, having one or more rotor blades mounted thereto, rotatably coupled to a generator via a slip coupling, the method comprising:
    detecting, via a controller, a loss of traction of the slip coupling based on a difference between data indicative of a rotor operating parameter and data indicative of a generator operating parameter;
    determining, via the controller, an angle of slip corresponding to the loss of traction as a function of the difference;
    determining a degradation value for the slip coupling corresponding, at least partially, to the angle of slip; and
    implementing a control action based on the degradation value,
    wherein detecting the loss of traction of the slip coupling further comprises:
        filtering the data indicative of the rotor operating parameter and the data indicative of the generator operating parameter, wherein filtering the data precludes an inclusion of at least one known parameter deviation from the determination of the difference between the data indicative of the rotor operating parameter and the data indicative of the generator operating parameter, the at least one known parameter deviation resulting from a cause not associated with the loss of traction of the slip coupling.

2. The method of claim 1, wherein determining the angle of slip corresponding to the loss of traction as a function of the difference further comprises: integrating, via the controller, the difference over a sampling interval to determine the angle of slip corresponding to the loss of traction.

3. The method of claim 1, wherein detecting the loss of traction of the slip coupling further comprises:
    determining, via the controller, an operating condition of the wind turbine;

determining, via the controller, a slip-indication threshold at the operating condition; and
detecting, via the controller, an absolute value of the difference which is greater than or equal to the slip-indication threshold.

4. The method of claim 3, wherein detecting the loss of traction of the slip coupling further comprises:
applying, via the controller, a delay correction to the data indicative of the generator operating parameter, wherein the delay correction compensates for a sampling rate difference between the data indicative of the rotor operating parameter and the data indicative of the generator operating parameter.

5. The method of claim 4, wherein detecting the loss of traction of the slip coupling further comprises:
determining, via a calibration module of the controller, a calibration factor for the rotor operating parameter; and
applying, via the controller, the calibration factor to the data indicative of the rotor operating parameter.

6. The method of claim 1, wherein the rotor operating parameter corresponds to a rotor speed, and wherein the generator operating parameter corresponds to a generator speed.

7. The method of claim 6, further comprising:
receiving, via the controller, data indicative of a rotational speed of a portion of a high-speed shaft of the drivetrain coupled between the slip coupling and a gearbox of the drivetrain; and
utilizing a gear ratio of the gearbox to determine the rotor speed of the rotor from the rotational speed of the portion of the high-speed shaft.

8. The method of claim 1, wherein the rotor operating parameter corresponds to a rotor inertia, and wherein the generator operating parameter corresponds to a generator torque.

9. The method of claim 1, wherein determining the degradation value for the slip coupling further comprises:
determining a per-event magnitude threshold for the angle of slip;
detecting, via the controller, an angle-of-slip magnitude corresponding to the loss of traction for a single event which exceeds the per-event magnitude threshold.

10. The method of claim 9, wherein determining the per-event magnitude threshold for the angle of slip further comprises:
determining, via the controller, an operating condition of the wind turbine;
determining, via the controller, the per-event magnitude threshold for the angle of slip at the operating condition.

11. The method of claim 10, wherein determining the operating condition of the wind turbine further comprises:
determining, via the controller, a rotor inertia;
determining, via the controller, a generator torque; and
determining, via the controller, a torque differential across the slip coupling based on the rotor inertia and the generator torque.

12. The method of claim 1, wherein determining the degradation value for the slip coupling further comprises:
adding an absolute value of the angle of slip to a cumulative slip count for the slip coupling over a sampling period, wherein the cumulative slip count is indicative of an accumulation of degrees of slip of the slip coupling over the sampling period.

13. The method of claim 12, further comprising:
determining an end-of-life wear threshold for the slip coupling based on a wear level at which a likelihood of the loss of traction of the slip coupling exceeds an acceptable limit, the end-of-life wear threshold being expressed in terms of an accumulated slip angle; and
detecting, via the controller, an approach of the cumulative slip count to the end-of-life wear threshold.

14. The method of claim 12, further comprising:
determining, via the controller, a rate of growth of the cumulative slip count in terms of at least one of cycle count and time;
determining an end-of-life wear threshold for the slip coupling based on a wear level at which a likelihood of the loss of traction of the slip coupling exceeds an acceptable limit, the end-of-life wear threshold being expressed in terms of an accumulated slip angle;
forecasting, with the controller, a remaining useful life of the slip coupling based on the rate of growth of the cumulative slip count and the end-of-life wear threshold.

15. The method of claim 14, wherein forecasting the remaining useful life of the slip coupling further comprises:
correlating, via the controller, the rate of growth to an operating condition of the wind turbine at a plurality of time intervals;
determining a plurality of forecasted rates of growth based, at least in part, on a plurality of forecasted operating conditions; and
determining, via the controller, a probability of approaching the end-of-life wear threshold at each of the plurality of forecasted rates of growth based on the plurality of forecasted operating conditions.

16. A system for controlling a wind turbine, the wind turbine having a rotor comprising one or more rotor blades mounted thereto and a generator rotatably coupled to the rotor via a slip coupling, the system comprising:
at least one operational sensor operably coupled to the rotor and configured to monitor a rotor operating parameter of the rotor in operation; and
a controller communicatively coupled to the generator and the at least one operational sensor, the controller comprising at least one processor configured to perform a plurality of operations, the plurality of operations comprising:
detecting a loss of traction of the slip coupling based on a difference between data indicative of the rotor operating parameter and data indicative of a generator operating parameter;
integrating the difference over a sampling interval to determine an angle of slip corresponding to the loss of traction;
determining a degradation value for the slip coupling corresponding, at least partially, to the angle of slip; and
implementing a control action based on the degradation value,
wherein detecting the loss of traction of the slip coupling further comprises:
filtering the data indicative of the rotor operating parameter and the data indicative of the generator operating parameter via a low-pass filter, wherein filtering the data precludes an inclusion of at least one known parameter deviation from the determination of the difference between the data indicative of the rotor operating parameter and the data indicative of the generator operating parameter.

17. The system of claim 16, wherein determining the degradation value for the slip coupling further comprises:

determining an operating condition of the wind turbine, wherein determining the operating condition comprises:
  determining a rotor inertia,
  determining a generator torque, and
  determining a torque differential across the slip coupling based on the rotor inertia and the generator torque;
determining a per-event magnitude threshold for the angle slip at the operating condition; and
detecting an angle-of-slip magnitude corresponding to the loss of traction for a single event which exceeds the per-event magnitude threshold.

18. The system of claim 16, wherein determining the degradation value for the slip coupling further comprises:
  adding an absolute value of the angle of slip to a cumulative slip count for the slip coupling over a sampling period, wherein the cumulative slip count is indicative of an accumulation of degrees of slip of the slip coupling over the sampling period;
  determining an end-of-life wear threshold for the slip coupling based on a wear level at which a likelihood of the loss of traction of the slip coupling exceeds an acceptable limit, the end-of-life wear threshold being expressed in terms of an accumulated slip angle; and
  detecting an approach of the cumulative slip count to the end-of-life wear threshold.

* * * * *